Dec. 11, 1962 J. L. S. DALEY ET AL 3,068,312
SEALED GALVANIC CELL
Filed Nov. 19, 1958
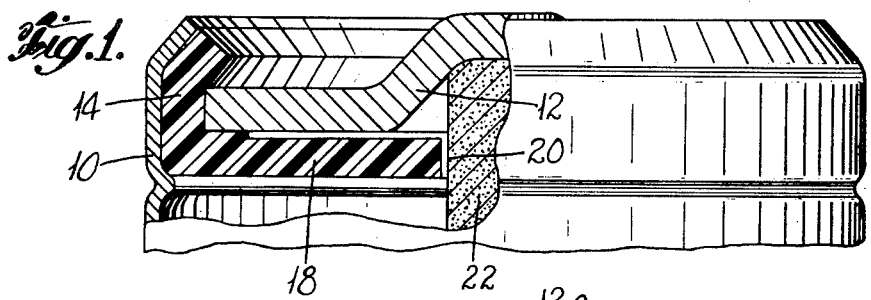
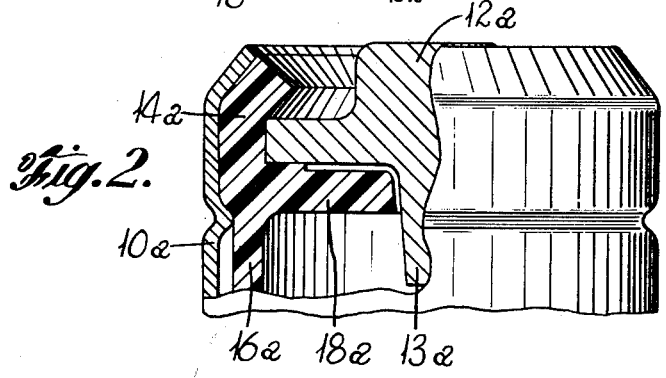
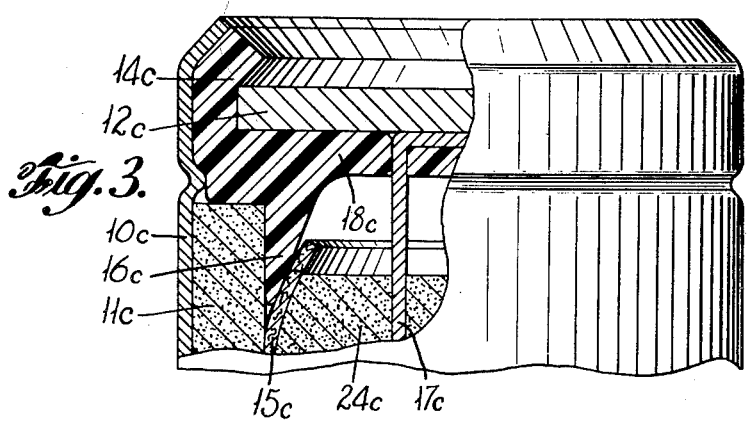
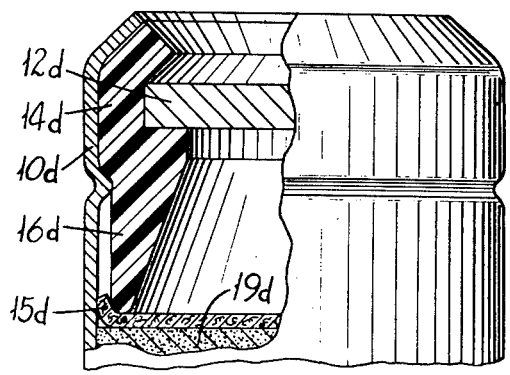
INVENTORS
JOHN L. S. DALEY
ERNEST E. LEGER
BY *John F. Hehmann*
ATTORNEY

United States Patent Office

3,068,312
Patented Dec. 11, 1962

3,068,312
SEALED GALVANIC CELL
John L. S. Daley, Bay Village, and Ernest E. Leger, Cleveland, Ohio, assignors to Union Carbide Corporation, a corporation of New York
Filed Nov. 19, 1958, Ser. No. 774,929
5 Claims. (Cl. 136—133)

This invention relates to a novel galvanic cell assembly, and more particularly, the invention relates to a novel seal ring for use in galvanic cells, especially of the alkaline type, which prevents escape of electrolyte from such cells.

For many years there have been so-called "leak proof" type cells available, but none of these cells have actually retained electrolyte successfully for long periods of time. Escape of electrolyte to the outside of the cell container is particularly a problem in the case of a cell containing a caustic electrolyte, which is about the most difficult to seal, for not only is the supply of electrolyte within the cell diminished but a hazard is created if the cell is to be handled. In the past, efforts have been directed towards the solution of the problem, but despite the complex and expensive lengths to which manufacturers have gone, improvements that have resulted have been of doubtful value.

Past attempts to provide leak-proof cells have shown that one of the major difficulties that must be overcome is what is termed "negative leakage," that is creepage of the electrolyte through the seal assembly of the cell at its negative terminal side.

The problem of negative leakage is not wholly a mechanical one, but one which also involves an electrocapillary action that takes place within a galvanic cell of ordinary design. Electrocapillary action is the result of electrolyte wetting the seal used to separate the oppositely charged parts of the cell container; i.e., the positive container cover and the negative container or vice versa, and thereby providing a path across which an electric current will flow. This current produces what is termed "electrocapillary drive" which encourages creepage and actually drives electrolyte from the cell no matter how good the mechanical seal. That this non-mechanical problem exists is shown by the fact that a galvanic alkaline cell of ordinary construction may evidence creepage of caustic electrolyte after only a few days of service, whereas a closed container, which is "unpolarized," and contains the same caustic electrolyte shows no evidence of creepage even after a period of several months.

Accordingly the principal object of the invention is to provide a seal which will prevent creepage of electrolyte from a galvanic cell.

A concurrent object of the invention is to provide a seal which substantially prohibits electrocapillary action from taking place within a galvanic cell and especially of the alkaline electrolyte type.

Broadly stated, the objects of the invention are accomplished by a novel seal ring having such a configuration that all short internal paths between the oppositely charged parts of the cell container are eliminated.

The invention may be more readily understood by reference to the accompanying drawings, wherein:

FIG. 1 is a fragmentary partially sectioned elevation of a D size nickel-cadmium alkaline cell, showing one embodiment of the invention;

FIG. 2 is a fragmentary partially sectioned elevation of an AA size nickel-cadmium alkaline cell, showing another embodiment of the invention;

FIG. 3 is a fragmentary partially sectioned elevation of an alkaline manganese dioxide-zinc cell, showing still another embodiment of the invention;

FIG. 4 is a fragmentary partially sectioned elevation of another type of alkaline cell, showing still another embodiment of the invention.

The AA and D size cells referred to in the specification are the standard sizes as defined in circular C466 of the National Bureau of Standards of the United States Department of Commerce.

More specifically, in the practice of the invention, a seal ring is provided for a galvanic cell that eliminates all short paths inside the cell container between oppositely charged container parts where direct electrolyte bridges might form, thereby eliminating, or at least substantially reducing any current flow between those parts. Such elimination or reduction of current flow in turn restricts any electro-capillary drive and thereby tends to prevent creepage of electrolyte from the cell. Creepage of electrolyte through the seal of the cell may be further deterred by using a seal made of a material which will not be readily wetted by electrolyte, and this will also eliminate any possibility of current flow directly through an electrolyte soaked seal.

In the various embodiments of the invention, shown in the accompanying drawings, the seal ring comprises an upstanding annular gasket interposed between the cell container cover and the cylindrical wall of the cell container having either or both, as the case may be, an annular depending and integral flange generally spaced from the wall and an integral diaphragm extending across and beneath the cell cover and generally partially spaced therefrom. In the latter case the diaphragm ordinarily has a small aperture for the current collector of one electrode to pass through. In each embodiment shown, it is obvious that all short paths between the oppositely charged parts of the container that the electrolyte could wet are eliminated and consequently the electrocapillary drive within the cell is diminished to such an extent that a suitable mechanical seal will successfully prevent creepage of electrolyte from the cell.

In the preferred embodiment of this invention the seal ring which is used is one which eliminates all short paths between the oppositely charged parts of the container and cover at the point of sealing, that the electrolyte could wet and which also can be used in the mechanical seal closure which is disclosed in the copending application, Serial No. 774,931, of R. Carmichael et al., filed November 19, 1958 concurrently herewith.

As disclosed therein, the seal closure used in effectuating the leak-proof sealing of a galvanic cell having a rigid metal sidewall comprises a cover made of a rigid metal and an annular gasket of hard, di-electric plastic-like material. The cover has a substantial horizontally disposed portion which terminates at the periphery of the cover in a vertical edge. The annular gasket of hard plastic is characterized by a resistance to cold-flow and a high compressive and shear strength. Further, the gasket is provided with an inner vertical section which corresponds to the vertical edge of the cover and an outer vertical section which corresponds to a section of the sidewall of the cylindrical container.

The gasket is interposed between the cover and the inner sidewall of the container with the corresponding vertical portions of the three members being in juxtaposition. The actual sealing of the cell is effected by radially compressing the gasket between the container sidewall and the cover under a high radial force which is normal to the vertical portions of the container sidewall, cover, and gasket, and parallel to the substantial horizontally disposed portion of the cover. After the compressive force is removed from the container, the gasket will exert a similar radial compressive force outwardly against the container which is substantially equivalent to, but not greater than the yield strength of the metal of which the sidewall of the container is made.

Referring now in particular to FIG. 1, the D size nickel-cadmium cell there illustrated, comprises a cupped metallic container 10, a conductive container cover 12 therefor, typically metallic, and a seal 14 interposed therebetween having such a configuration as to eliminate all the short paths that the electrolyte might bridge between the oppositely charged parts of the cell. The seal ring 14 comprises a circular diaphragm 18 extending across and beneath the cover 12. An opening 20 is provided in the circular diaphragm 18 to allow a positive collector 22 to pass into the body of the cell.

Referring now in particular to FIG. 2, the AA size nickel-cadmium cell there illustrated, comprises a cupped metallic container 10a, a conductive container cover 12a therefor, having a depending terminal 13a extending into the body of the cell, and a seal ring 14a interposed between the container 10a and cover 12a. The seal ring 14a comprises a diaphragm 18a partially spaced from the cover 12a, through which the depending terminal 13a of the cover 12a passes, and a depending annular flange 16a spaced from the container wall. The fact that the diaphragm 18a and the flange 16a are spaced from the cover 12a and the container wall respectively allows for the utilization of both sides of the diaphragm 18a and the flange 16a to extend the bridge path within the cell to a length which would greatly reduce an current flow directly across the gasket if the electrolyte was successful in bridging it. The circular diaphragm 18 of the seal 14 shown in FIG. 1, may be similarly spaced from the cover 12 and the positive collector 22.

Referring now in particular to FIG. 3, the alkaline manganese dioxide-zinc cell there illustrated, comprises a cupped metallic container 10c, a conductive container cover 12c therefor, an annular sheath of cathodic mix 11c adjacent the container wall, and a separator 15c which separates the cathodic mix 11c from a metal powdered mix 24c in the center of the cell. The seal ring 14c which embodies the principles of the invention, comprises a depending annular flange 16c extending into the cell and fitted over the cathodic mix 11c and between the cathodic mix 11c and the separator 15c. A collector bar 17c passes through the diaphragm 18c of the seal and extends into the central portion of the cell. The flange 16c extending downwardly between and partially separating the cathodic mix 11c and the separator 15c serves in a secondary capacity by preventing the possibility of the cell short circuiting by migration of the cathodic mix 11c within the cell and also prevents the separator 15c from being pinched by the seal assembly.

Referring now in particular to FIG. 4, the alkaline cell there illustrated, comprises a cupped metallic container 10d and a conductive container cover 12d therefor, between which is interposed the seal ring 14d of the invention. Below the seal ring, the cell has a separator 15d which separates the active mix 19d from the top of the cell. The seal ring 14d comprises an annular flange 16d depending from beneath the cell cover 12d to the separator 15d, which is spaced from the metallic container wall and provides a very long path which once again greatly reduces any effect of electrocapillary drive on creepage by greatly reducing the possibility of electrolyte bridging the seal, and in the event that it did, greatly reducing any current that might flow.

In order to illustrate the superiority of the seal ring of the invention, a series of tests was made in which three types of seal rings were used and the storage shelf life of the individual cells was recorded. It should be understood before describing the tests in detail that the tests were performed under aggravated or forced conditions so that the cells tested when stored under ordinary conditions would not all exhibit the failures described or at least not within the short storage period indicated. The first seal assembly tested was a ring type seal, commonly used in the prior art, which consisted of a neoprene ring interposed between the cover and the container wall of the cell. This seal ring served as a control for the tests and the results of this test are recorded below in Table I. The other seal assemblies tested consisted of the diaphragm seal of the invention shown in FIG. 1 and the diaphragm and depending flange type seal shown in FIG. 3 and the results of these tests are recorded in Table II and Table III respectively. Each of the seal rings embodying the principles of the invention was made of polyethylene, and the seal closure thereof was effected by radially compressing the seal ring as described in the aforementioned patent application. Although it is preferred that a hard nylon composition seal ring be used to effect a tight mechanical seal, the seal rings used in the tests were sufficient to illustrate the superiority of the seal ring of the invention.

All of the cells tested test were alkaline cells, and the tests were run by storing the cells for a period of from one to eight weeks at a temperature of 60° C. and periodically removing from storage those cells which were found unsatisfactory due to creepage of electrolyte through the seal of the cell as indicated by a heavy crust of exudate forming on the exterior of the cell. In the tables below, S stands for cells found to have a satisfactory seal closure after the indicated passage of time and U stands for cells found to have an unsatisfactory seal closure after the indicated passage of time.

After one week, only 10 percent of the cells having the ring type seal of the prior art were still in satisfactory condition and all were unsatisfactory by the end of the second week.

TABLE I

*Neoprene Ring Type Seal*

| Lot. No. | No. Cells | 1 Week | | 2 Week | |
|---|---|---|---|---|---|
| | | S | U | S | U |
| 1 | 5 | | 5 | | 5 |
| 2 | 5 | | 5 | | 5 |
| 3 | 5 | | 5 | | 5 |
| 4 | 5 | | 5 | | 5 |
| 5 | 5 | 3 | 2 | | 5 |
| 6 | 5 | | 5 | | 5 |
| Totals | 30 | 3 | 27 | 0 | 30 |
| Total Satisfactory, percent | | 10 | | 0 | |

After one week, 95 percent of the cells having the diaphragm type seal of the subject invention were still in satisfactory condition and at the end of two weeks, at which time all of the cells having the ring seal of the prior art were found to be unsatisfactory, 90 percent of the cells were still found to be satisfactory. It was not until the sixth week that all the cells were found to be unsatisfactory.

TABLE II

*Diaphragm Type Seal*

| Lot. No. | No. Cells | 1 Week | | 2 Weeks | | 3 Weeks | | 4 Weeks | | 5 Weeks | | 6 Weeks | |
|---|---|---|---|---|---|---|---|---|---|---|---|---|---|
| | | S | U | S | U | S | U | S | U | S | U | S | U |
| 1 | 5 | 5 | ---- | 5 | ---- | ---- | 5 | ---- | 5 | ---- | 5 | ---- | 5 |
| 2 | 5 | 5 | ---- | 5 | ---- | 3 | 2 | 1 | 4 | 1 | 4 | ---- | 5 |
| 3 | 5 | 5 | ---- | 5 | ---- | 5 | ---- | 4 | 1 | 3 | 2 | ---- | 5 |
| 4 | 5 | 4 | 1 | 3 | 2 | 1 | 4 | 1 | 4 | ---- | 5 | ---- | 5 |
| Totals | 20 | 19 | 1 | 18 | 2 | 9 | 11 | 6 | 14 | 4 | 16 | 0 | 20 |
| Total Satisfactory, percent | | 95 | | 90 | | 45 | | 30 | | 20 | | 0 | |

None of the cells having the diaphragm and depending flange type seal of the subject invention were found to be unsatisfactory during the first three weeks of the test and at the end of eight weeks when the test was discontinued 83 percent of the cells were still found to be satisfactory.

TABLE III

*Diaphragm and Depending Flange Seal*

| Lot. No. | No. Cells | 3 Weeks | | 4 Weeks | | 5 Weeks | | 6 Weeks | | 7 Weeks | | 8 Weeks | |
|---|---|---|---|---|---|---|---|---|---|---|---|---|---|
| | | S | U | S | U | S | U | S | U | S | U | S | U |
| 1 | 5 | 5 | ---- | 4 | 1 | 4 | 1 | 4 | 1 | 4 | 1 | 4 | 1 |
| 2 | 5 | 5 | ---- | 5 | ---- | 5 | ---- | 5 | ---- | 5 | ---- | 5 | ---- |
| 3 | 5 | 5 | ---- | 5 | ---- | 5 | ---- | 5 | ---- | 5 | ---- | 4 | 1 |
| 4 | 5 | 5 | ---- | 5 | ---- | 5 | ---- | 5 | ---- | 4 | 1 | 4 | 1 |
| 5 | 5 | 5 | ---- | 5 | ---- | 5 | ---- | 4 | 1 | 4 | 1 | 4 | 1 |
| 6 | 5 | 5 | ---- | 5 | ---- | 5 | ---- | 5 | ---- | 5 | ---- | 5 | ---- |
| 7 | 5 | 5 | ---- | 4 | 1 | 4 | 1 | 4 | 1 | 3 | 2 | 3 | 2 |
| Totals | 35 | 35 | 0 | 33 | 2 | 33 | 2 | 32 | 3 | 30 | 5 | 29 | 6 |
| Total Satisfactory, percent | | 100 | | 94 | | 94 | | 91 | | 86 | | 83 | |

A study of the figures of the above tables will show that, whereas 100 percent of the cells having the seal ring of the prior art had failed by the end of two weeks, only 10 percent of the cells having the diaphragm seal of the invention had failed and 0 percent of the cells having the diaphragm and depending flange seal of the invention had failed at such a time. Moreover, 83 percent of the cells having the diaphragm and depending flange seal of the invention were still satisfactory at the end of eight weeks and it should be emphasized that this great improvement was made possible by the use of the seal ring of the invention even though the seal rings used in the test were not of the preferred material. Overall, the figures in the above tables conclusively prove the success of the invention.

What is claimed is:

1. A sealed galvanic cell comprising a cupped metallic container made of a rigid metal and having an electrolyte therein; said cell being sealed at the open end of said cupped container by a seal closure which comprises a cover made of a rigid metal and a seal ring made of a hard di-electric plastic-like material which is not readily wetted nor deleteriously affected by said electrolyte and is characterized by a resistance to cold-flow and a high compressive and shear strength; said cover and container having opposite electrical charges, said cover having a substantial horizontally disposed portion which terminates at the periphery of said cover in a vertical edge; said seal ring having an annular, generally upstanding portion having an inner vertical section which corresponds to said vertical edge of said cover and an outer vertical section which corresponds to a section of said cupped cylindrical container; said annular upstanding portion of said seal ring being interposed between said cover and the inner sidewall of said cupped container with said vertical portions in juxtaposition with the corresponding vertical portions of said container sidewall and said cover; said annular upstanding portion being in a state of radial compression between said cover and said container sidewall and exerting a force which is normal to said vertical portions of said container sidewall, cover, and annular upstanding portion, and parallel to said substantial horizontally disposed portion of said cover; said force being substantially equivalent to, but not greater than the yield strength of the rigid metal of which said cupped container is formed; and said seal ring having another portion integral with said upstanding portion which physically and electrolytically separates said oppositely charged cover and container at the point of sealing from electrolyte carrying elements of said cell and provides an elongated electric current path between said oppositely charged cover and container when the surface of said another portion is wetted by electrolyte.

2. The sealed galvanic cell of claim 1 wherein said seal ring is made of a hard nylon plastic.

3. The sealed galvanic cell of claim 2 wherein said another portion of said seal ring which is integral with said upstanding portion is a circular diaphragm depending from said upstanding portion which extends across the top of said cell beneath said cell cover and is generally partially spaced therefrom.

4. The sealed galvanic cell of claim 2 wherein said another portion of said seal ring which is integral with said upstanding portion is an annular depending flange which is generally spaced from said inner wall of said container.

5. The sealed galvanic cell of claim 2 wherein said another portion of said seal ring which is integral with said upstanding portion consists of a circular diaphragm depending from said upstanding portion which extends across the top of said cell beneath said cell cover and is generally partially spaced therefrom and a depending flange which is generally spaced from said inner wall of said container.

(References on following page)

References Cited in the file of this patent

UNITED STATES PATENTS

| | | |
|---|---|---|
| 2,447,493 | Daniel | Aug. 24, 1948 |
| 2,495,247 | Friedman | Jan. 24, 1950 |
| 2,636,062 | Colton | Apr. 21, 1953 |
| 2,665,329 | Brennan | Jan. 5, 1954 |
| 2,712,565 | Williams | July 5, 1955 |
| 2,843,650 | Jacquier | July 15, 1958 |

OTHER REFERENCES

Principles of High-Polymer Theory and Practice (Schmidt et al.), published by McGraw-Hill (New York), 1948, pages 270 and 513 are relied on.